(12) United States Patent
Hong et al.

(10) Patent No.: US 10,547,045 B2
(45) Date of Patent: Jan. 28, 2020

(54) METHODS AND APPARATUSES FOR POLYMER FIBRILLIZATION UNDER ELECTRIC FIELD

(71) Applicant: Maxwell Technologies, Inc., San Diego, CA (US)

(72) Inventors: Jian Hong, San Diego, CA (US); Xiaomei Xi, Carlsbad, CA (US)

(73) Assignee: Maxwell Technologies, Inc., San Diego, CA (US)

(*) Notice: Subject to any disclaimer, the term of this patent is extended or adjusted under 35 U.S.C. 154(b) by 488 days.

(21) Appl. No.: 14/642,471

(22) Filed: Mar. 9, 2015

(65) Prior Publication Data

US 2015/0255779 A1    Sep. 10, 2015

Related U.S. Application Data

(60) Provisional application No. 61/950,699, filed on Mar. 10, 2014.

(51) Int. Cl.
| | |
|---|---|
| *H01M 4/04* | (2006.01) |
| *H01G 11/86* | (2013.01) |
| *H01M 4/62* | (2006.01) |

(52) U.S. Cl.
CPC ......... *H01M 4/045* (2013.01); *H01G 11/86* (2013.01); *H01M 4/623* (2013.01)

(58) Field of Classification Search
CPC ........ H01M 4/045; H01M 4/04; H01M 4/139; H01M 4/622; H01M 4/623; H01M 4/8668;
(Continued)

(56) References Cited

U.S. PATENT DOCUMENTS

| | | |
|---|---|---|
| 4,161,013 A | 7/1979 | Grodzinsky et al. |
| 4,976,904 A | 12/1990 | Bilhorn |

(Continued)

FOREIGN PATENT DOCUMENTS

| | | |
|---|---|---|
| EP | 0 060 687 | 9/1982 |
| EP | 0060687 | 9/1982 |

(Continued)

OTHER PUBLICATIONS

Wu Dacheng, Du Zhongliang, Gao Xushan, "Nanofibers", pp. 42-43, Beijing: Chemical Industry Press, Published Jan. 31, 2003.

*Primary Examiner* — Jacob T Minskey
*Assistant Examiner* — Melody Tsui
(74) *Attorney, Agent, or Firm* — Knobbe, Martens, Olson & Bear, LLP

(57) ABSTRACT

A method of fibrillizing a fibrillizable binder component of an electrode film can include providing a negatively charged fibrillizable binder component, and applying an electric field upon the negatively charged binder component to fibrillize the negatively charged fibrillizable binder component. A system for fibrillizing a binder component of an electrode film can include a mixing container made of a material having an affinity to donate electron(s) to the binder component, and an actuator configured to apply a force upon the mixing container so as to contact the mixing container with the binder component and to move the mixing container and the binder component relative to each other within a speed and range of motion sufficient to create an electrostatic force on the binder component and fibrillize the binder component.

14 Claims, 9 Drawing Sheets

(58) Field of Classification Search
CPC ......... H01M 4/88; H01G 11/30; H01G 11/38; H01G 11/86
See application file for complete search history.

(56) References Cited

U.S. PATENT DOCUMENTS

| | | | |
|---|---|---|---|
| 6,616,435 B2* | 9/2003 | Lee | D01D 5/0061 425/174.8 E |
| 6,778,379 B2* | 8/2004 | Iwaida | H01G 11/38 29/25.03 |
| 7,112,383 B2* | 9/2006 | Konabe | C08F 14/26 429/309 |
| 7,245,478 B2 | 7/2007 | Zhong et al. | |
| 7,307,830 B2 | 12/2007 | Galley et al. | |
| 7,492,571 B2 | 2/2009 | Zhong et al. | |
| 7,740,461 B2 | 6/2010 | Chang et al. | |
| 7,791,861 B2 | 9/2010 | Zhong et al. | |
| 7,855,870 B2 | 12/2010 | Fujimoto | |
| 7,866,582 B2 | 1/2011 | Nied | |
| 7,907,387 B2 | 3/2011 | Aubert et al. | |
| 7,935,155 B2 | 5/2011 | Mitchell et al. | |
| 8,153,286 B2 | 4/2012 | Yu et al. | |
| 8,213,156 B2 | 7/2012 | Mitchell et al. | |
| 8,241,537 B2 | 8/2012 | Chang et al. | |
| 2004/0105216 A1 | 6/2004 | Iwaida et al. | |
| 2004/0114309 A1* | 6/2004 | Iwaida | H01G 9/058 361/508 |
| 2005/0088911 A1* | 4/2005 | Sordelli | B01F 9/0001 366/217 |
| 2005/0250011 A1* | 11/2005 | Mitchell | H01G 9/058 429/217 |
| 2006/0143884 A1 | 7/2006 | Mitchell et al. | |
| 2008/0117565 A1 | 5/2008 | Zhong et al. | |
| 2008/0236742 A1* | 10/2008 | Mitchell | H01G 11/28 156/321 |
| 2009/0236451 A1 | 9/2009 | Roland | |
| 2011/0165466 A1 | 7/2011 | Zhamu et al. | |
| 2011/0175252 A1 | 7/2011 | Liu et al. | |
| 2014/0030590 A1* | 1/2014 | Wang | H01B 1/04 429/211 |

FOREIGN PATENT DOCUMENTS

| | | |
|---|---|---|
| EP | 0 179 688 | 4/1986 |
| EP | 0179688 | 4/1986 |
| GB | 2408959 A | 6/2005 |
| KR | 20020051066 A | 6/2002 |
| WO | WO 2005/008807 | 1/2005 |
| WO | WO 2006/007248 | 1/2006 |

* cited by examiner

METHODS AND APPARATUSES FOR POLYMER FIBRILLIZATION UNDER ELECTRIC FIELD

REFERENCE TO RELATED APPLICATIONS

Any and all applications for which a foreign or domestic priority claim is identified in the Application Data Sheet as filed with the present application are hereby incorporated by reference under 37 CFR 1.57.

BACKGROUND

Field

The present invention relates to energy storage devices, particularly to methods and apparatuses for fabricating dry particle films for use in energy storage devices.

Description of the Related Art

There are many different types of energy storage devices used to power electronic devices, including for example capacitors, such as for example, ultracapacitors or lithium-ion capacitors, batteries, such as lithium-ion batteries, and fuel cells. An energy storage device can include one or more films, such as an electrode film forming an electrode of the energy storage device. The electrode film may comprise one or more active materials. The film can include a fibrillized binder component, the fibrillized binder component providing a plurality of fibrils which can support one or more other components of the film (e.g., providing mechanical structure for the film).

Fibrillization of binder components for electrode films can be typically performed using a mechanical fibrillization process. Components of the electrode film, including the binder component of the electrode film, can be combined and blended in an apparatus, such as, a blender, and/or a jet mill in which a strong shear force can be applied upon the binder component to manipulate the binder component so as to form fibrils. Fibrillization of the binder component can facilitate formation of a matrix, lattice and/or web of fibrils in which one or more other components of an electrode film, such as an active electrode material, can be supported. Fibrils of a binder component can provide desired mechanical strength for an electrode film. For example, the fibrils can provide films having desired resistance to a tensile, shear, compressive, and/or twisting stress, facilitating fabrication of energy storage devices having dry particle electrode films.

SUMMARY

One embodiment includes a method of fibrillizing a binder component of an electrode film. This embodiment can include providing a negatively charged fibrillizable binder component, and fibrillizing the negatively charged fibrillizable binder component by applying an electric field upon the negatively charged fibrillizable binder component.

In some embodiments, applying the electric field can include applying an electrostatic field.

In some embodiments, providing the negatively charged fibrillizable binder component can include contacting a fibrillizable binder component with an electron donor.

In some embodiments, contacting the fibrillizable binder component with the electron donor can include applying an acoustic force upon the fibrillizable binder component. The electron donor may include a mixing container of a fibrillization apparatus, where the mixing container is made of a material having an affinity to donate electrons to the fibrillizable binder component. In some embodiments, contacting the fibrillizable binder component with the electron donor can include applying at least one of a linear force and a rotational force upon the mixing container to displace the mixing container relative to the fibrillizable binder component.

In some embodiments, providing the negatively charged fibrillizable binder component can include contacting the fibrillizable binder component with a mixing medium.

In some embodiments, the method can further include drying the fibrillizable binder component prior to applying the electric field upon the negatively charged fibrillizable binder component. Drying the fibrillizable binder component can include heating the fibrillizable binder component in a vacuum oven.

In some embodiments, the fibrillizable binder component can include polytetrafluoroethylene.

Another embodiment includes a system for fibrillizing a binder component of an electrode film. This embodiment can include a mixing container including a material having an affinity to donate one or more electrons to the binder component, and an actuator configured to apply a force upon the mixing container to contact the mixing container with the binder component and to move the mixing container and the binder component relative to each other within a speed and range of motion sufficient to create an electrostatic force on the binder component and fibrillize the binder component.

In some embodiments, the system can further include the binder component and a mixing medium with a material having an affinity to transfer negative charge from the mixing container to the binder component. The mixing medium may include a same material as the binder component. In some embodiments, the mixing medium and the binder component both comprise polytetrafluoroethylene.

In some embodiments, the actuator is further configured to apply a force upon the mixing container to contact the mixing medium with at least one of the mixing container and the binder component.

In some embodiments, the actuator is configured to apply an acoustic force to the binder component. In some embodiments, the actuator is configured to apply at least one of a linear force and a rotational force upon the mixing container.

In some embodiments, the mixing container can be made of an aluminum material. In some embodiments, the mixing medium may include a same material as the mixing container, such as the aluminum material.

In some embodiments, the system can further include a mixer for combining the binder component with one or more other components of the electrode film. The system may include a low shear mixer for combining the binder component with one or more other components of the electrode film mixture. In some embodiments, the system can further include an oven for drying the binder component and the one or more other components of the electrode film.

Another embodiment includes a system which can have an electric-field generator, a container, and a fibrillizable binder component. The electric-field generator may be configured to apply an electric field to the fibrillizable binder component and fibrillize the fibrillizable binder component with the electric field when the fibrillizable binder component is contained within the container.

For purposes of summarizing the invention and the advantages achieved over the prior art, certain objects and advantages are described herein. Of course, it is to be understood that not necessarily all such objects or advantages need to be achieved in accordance with any particular embodiment. Thus, for example, those skilled in the art will recognize that the invention may be embodied or carried out in a manner that can achieve or optimize one advantage or a group of advantages without necessarily achieving other objects or advantages.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

BRIEF DESCRIPTION OF THE DRAWINGS

These and other features, aspects, and advantages of the present disclosure are described with reference to the drawings of certain embodiments, which are intended to illustrate certain embodiments and not to limit the invention.

DETAILED DESCRIPTION

Figure 1:
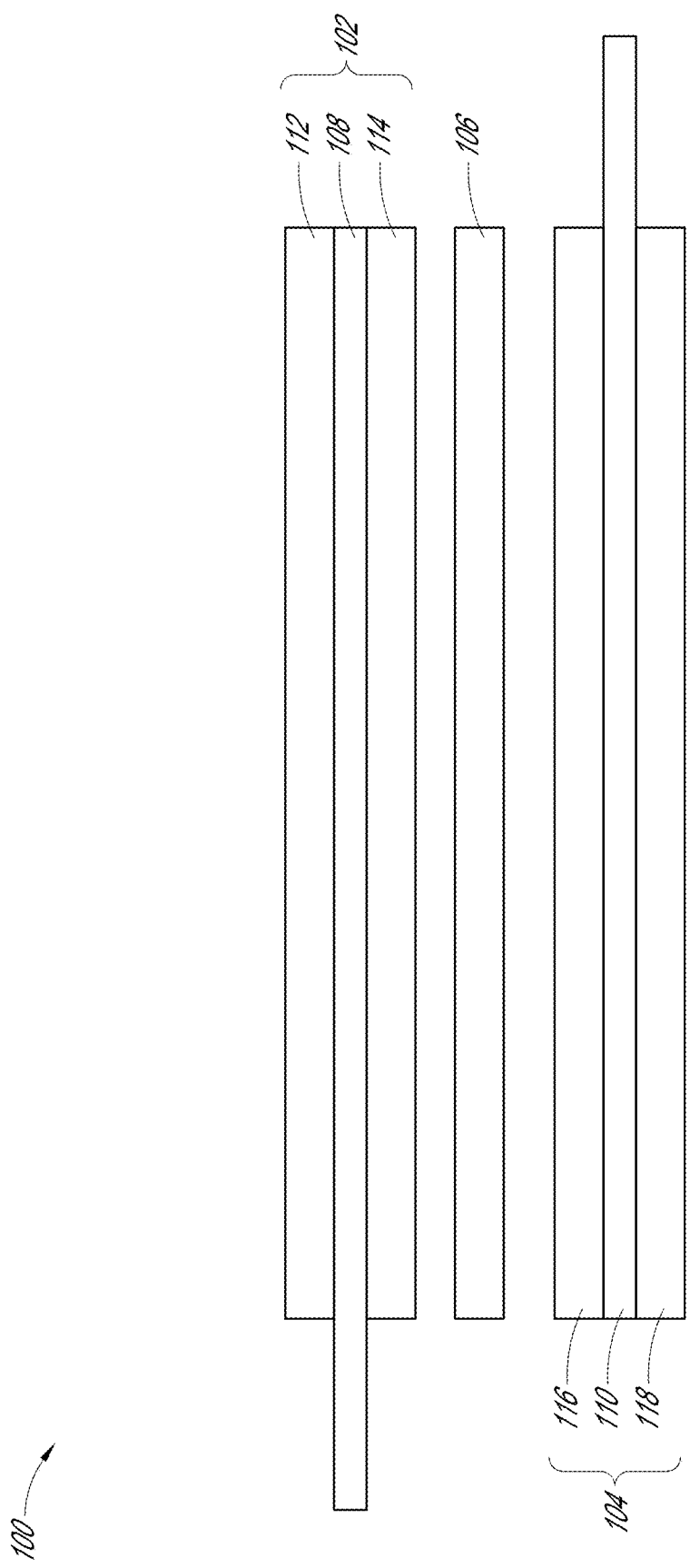
FIG. 1 shows a cross-sectional view an example of an energy storage device including an electrode film on a surface of a current collector.

Although certain embodiments and examples are described below, those of skill in the art will appreciate that the invention extends beyond the specifically disclosed embodiments and/or uses and obvious modifications and equivalents thereof. Thus, it is intended that the scope of the invention herein disclosed should not be limited by any particular embodiments described below.

As described herein, mechanical processes of binder fibrillization can include application of high shear forces upon the binder. However, mechanical fibrillization processes in which high shear forces are applied can result in damage of an active material component of the electrode film mixture. For example, one or more surface properties of an active material component, such as a carbon component of the electrode film mixture, may be undesirably changed by the strong shear force, diminishing a chemical and/or electrical property of the active material component. Mixing of electrode film components in a blender under high shear stress may also contribute to local heating of the electrode film components in the blender. Such heating can further contribute to diminished chemical and/or electrical properties of one or more active material components of the electrode film, and/or can provide inefficient and/or non-uniform fibrillization of the binder component.

One embodiment includes a method of fabricating an electrode film that includes fibrillization of a binder component using an electric field. A negatively charged fibrillizable binder component can be subjected to an electric field, such that the negatively charged binder component is manipulated by the electric field to achieve fibrillization of the binder component. In some embodiments, a negative charge can be placed upon a binder component to provide the negatively charged binder component. For example, the binder component can be made from a material having an affinity to receive one or more electrons (i.e., an electron acceptor) from a material having an affinity to donate one or more electrons to the binder component (i.e., an electron donor). Suitable binder components may be made of a material having a high dielectric constant, such as polyethylene (PE) and/or polytetrafluoroethylene (PTFE). Suitable material for an electron donor can include, for example, aluminum. In some embodiments, the binder component can contact the electron donor to transfer negative charge from the electron donor to the binder component.

In some embodiments, the electric field can be an electrostatic field. In some embodiments, an apparatus for fibrillizing a binder component of an electrode film can be configured to generate an electrostatic field. In some embodiments, the fibrillization apparatus can be configured to place one or more negative charges on the binder component such that the binder component can be manipulated by the electrostatic field and the binder component can be fibrillized. In some embodiments, the fibrillization apparatus can include a mixing container for providing a negative charge to the binder component. In some embodiments, the fibrillization apparatus can include a mixing medium to facilitate charge transfer between the mixing container and the binder component. In some embodiments, the mixing medium can provide a negative charge to the binder component. Contact between the mixing medium, the mixing container, and/or the electrode film binder component can facilitate transfer of electrons from the mixing container and/or the mixing medium to the electrode binder component, and/or generation of the electrostatic field. Movement of the mixing container, mixing medium and/or the electrode film binder component relative to one another can facilitate transfer of electrons and the generation of the electrostatic field. Such contact and/or movement can be facilitated by applying force to the mixing container, the mixing medium, and/or the electrode film binder component, including the electrode film mixture comprising the electrode film binder component. For example, the apparatus for fibrillizing a binder component can be configured to generate an electrostatic field and to expose a binder component comprising polytetrafluoroethylene (PTFE) to the electrostatic field such that fibrillization of the PTFE binder component can be achieved.

In some embodiments, a fibrillization process using an electric field can facilitate a process in which reduced shear stress is applied upon one or more components of an electrode film. Shear forces applied upon components of an electrode film may be significantly diminished in an electrostatic field fibrillization process. In some embodiments, an electrostatic field fibrillization process can facilitate a process in which negligible shear stress is applied to components of an electrode film. In some embodiments, reducing shear stress can facilitate reduced damage to one or more components of the electrode film, for example relative to a conventional shear-based fibrillization process. For example, electrochemical characteristics of an active material component within the electrode mixture, such as activated carbon, can be maintained when using an electrostatic field fibrillization process, relative to those characteristics prior to fibrillization of the binder component within the mixture. In some embodiments, an electrostatic fibrillization process may facilitate effective fibrillization while maintaining physical and/or electrochemical integrity of active material components of the electrode film.

In some embodiments, energy storage devices, including ultracapacitors, batteries, and/or lithium based energy storage devices, such as for example, lithium ion capacitors, and/or lithium ion batteries, can have electrode films made of a fibrillizable binder component that is fibrillized using an electrostatic fibrillization process. In some embodiments, maintaining one or more electrochemical characteristics of an active material component within the electrode mixture may be particularly advantageous for energy storage devices having electrical performances which are more sensitive to the integrity of active material components. In some embodiments, maintaining one or more electrochemical characteristics of an active material component within the electrode mixture may be particularly advantageous for batteries, including lithium ion batteries.

In some embodiments, fibrillization of binder components using an electric field can be advantageously integrated into one or more dry processes for fabricating electrode films. As used herein, dry processes can refer to one or more processes of electrode fabrication performed in the absence or substantially in the absence of solvents, including processes in which only or substantially only dry particles are used. In some embodiments, fibrillization of binder components using electric field can be integrated into a dry process for fabricating an electrode film to provide a free standing dry particles film.

In some embodiments, using an electric field, such as an electrostatic field, to fibrillize a binder component of an electrode film can advantageously facilitate a more efficient fibrillization process. For example, an electrostatic fibrillization process can provide an increased number of fibrils from a quantity of binder material, an increased uniformity in the fibrils formed, and/or improved mechanical strength of fibrils formed, relative to a conventional shear-based fibrillization process.

In some embodiments, fibrillization using an electric field, such as electrostatic fibrillization, can facilitate up to about a 5% reduction by weight of binder material used, including about a 2% reduction by weight of binder material used, relative to a conventional shear-based fibrillization process. Reduced binder content and/or improved electrochemical integrity of an active material component may facilitate improved electrical performance of the electrode film (e.g., improving device equivalent series resistance, ESR, performance) relative to an electrode film formed through a conventional shear-based fibrillization process. In some embodiments, an ultracapacitor comprising electrode films fabricated using an electric field, such as electrostatic fibrillization, can demonstrate up to about 25% reduction in ESR as compared to an ultracapacitor comprising electrode films fabricated using a conventional shear-based fibrillization process. In some embodiments, an energy storage device including one or more electrode films made of a binder component fibrillized using an electric field, such as an electrostatic fibrillization process can have at least about a 10% to about 20% improvement in power and/or energy performance relative to an energy storage device prepared under similar conditions using a conventional shear-based fibrillization process.

FIG. 1 shows an example of an energy storage device 100. The energy storage device 100 can include an ultracapacitor, and/or a battery. The energy storage device 100 can include a first electrode 102, a second electrode 104, and a separator 106 positioned between the first electrode 102 and second electrode 104. The separator can be configured to electrically insulate two electrodes adjacent to opposing sides of the separator, such as the first electrode 102 and the second electrode 104, while permitting ionic communication between the two adjacent electrodes. The separator 106 can be made of a variety of porous electrically insulating materials. In some embodiments, the separator 106 can be made of a polymeric material. For example, the separator 106 can be made of a cellulosic material (e.g., paper), and/or a polypropylene material.

In some embodiments, the first electrode 102 and/or the second electrode 104 can include a first current collector 108, and a second current collector 110, respectively, for facilitating electrical coupling between the corresponding electrode and an external circuit. The first current collector 108 and/or the second current collector 110 can be made of any combination of a number of suitable electrically conductive materials. The first current collector 108 and/or the second current collector 110 can have various shapes and/or sizes suitable to facilitate transfer of electrical charges between the corresponding electrode and an external terminal, such as for example, a terminal of an external electrical circuit. For example, a current collector can include a metallic material, such as an aluminum, nickel, copper, and/or silver material. For example, the first current collector 108 and/or the second current collector 110 can include an aluminum foil having a rectangular or substantially rectangular shape.

Referring to FIG. 1, the first electrode 102 and the second electrode 104 can include electrode films 112, 114, and 116, 118 on a first surface and a second opposing surface of the electrode current collectors 108, 110, respectively. The electrode films 112, 114, 116 and/or 118 can have a variety of suitable shapes, sizes, and/or thicknesses. For example, an electrode film can have a thickness of about 100 microns to about 250 microns.

In some embodiments, one or more of the electrode films 112, 114, 116 and 118 can be made from an electrode film mixture comprising a plurality of dry particles. In some embodiments, one or more of the electrode films 112, 114, 116 and 118 can be made from an electrode film mixture comprising one or more carbon-based electroactive components (i.e., "active carbon"), including for example a porous carbon material, such as activated carbon (e.g., commercially available from Kuraray Chemical Co., LTD., of Osaka, Japan). In some embodiments, an electrode film mixture can include graphite, soft carbon, and/or hard carbon. In some embodiments, an electrode film mixture can include one or more additives, including for example one or more additives for improving electrical conductivity of the electrode film (i.e., "conductive carbon"). For example, an electrode film mixture can include a conductive carbon component, such as conductive carbon black (e.g., Super P® commercially available from Timcal Graphite & Carbon, of Bodio, Switzerland).

The electrode film mixture can include one or more additives for enhancing the structural integrity of the electrode film, such as a binder component. In some embodiments, the binder components can include one or more of a variety of polymers having an increased dielectric constant. In some embodiments, polyethylene (PE) can be suitable, including ultra-high-molecular-weight polyethylene (UHMWPE). In some embodiments, polytetrafluoroethylene (PTFE) is suitable. Polymers able to receive one or more electrons from an electron donor may be a suitable binder. The binder components can be fibrillizable binder. For example, one or more electrode films 112, 114, 116, 118 may include a fibrillized binder component made of a fibrillizable binder component which was fibrillized using an electric field, such as an electrostatic fibrillization process. As used herein, a fibrillized binder component can be structurally distinguished from a fibrillizable binder component by a person having ordinary skill in the art using available scientific apparatus and methods, such as through observation of the size and/or number of fibrils.

Composition of the electrode films 112, 114, 116, and/or 118 may be selected to enable a desired electrode capacitance and/or resistance performance. In some embodiments, one or more of the electrode films 112, 114, 116, and 118 can be made of about 50% to about 99% by weight (e.g., including about 85% to about 90% by weight) of activated carbon, up to about 20% by weight (e.g., including about 0.5% to about 15% by weight, including about 5% to about 10% by weight) of binder material, and up to about 25% (e.g., including about 1% to about 10%) by weight of electrical conductivity promoting material.

In one embodiment, an electrode film mixture can include about 70 grams to about 100 grams (e.g., about 90 grams) of activated carbon, up to about 5 grams of a conductive carbon additive component (e.g., about 2 grams of a conductive carbon black material). The electrode film mixture can include polytetrafluoroethylene (PTFE) as binder component. For example, the electrode film mixture can include about 5 weight % to about 10 weight % of the binder component.

In some embodiments, one or more of the electrodes 102, 104 may be fabricated using a dry electrode processing method. In dry processing, for example, an electrode film mixture comprising components of the electrode film (e.g., electroactive material, electrical conductivity promoting material and/or binder material) may be blended to form a mixture. In some embodiments, the blended mixture is compressed to form a film-like structure, such as the electrode films 112, 114, 116 and 118. In some embodiments, the electrode films 112, 114, 116, 118, can be calendared onto the corresponding current collector surface.

Forming one or more of the electrode films 112, 114, 116, and 118, can also typically include fibrillization of the binder component. For example, fibrillization of the binder component can form fibrils, for example, a web of fibrils, which can provide a matrix-like structure for supporting one or more other components of the electrode film, such as activated carbon and/or conductive carbon black.

In some embodiments, an electric field can be used to facilitate fibrillization of an electrode film binder component. As described herein, a suitable binder component can include one or more polymers having an affinity to receive one or more electrons from an electron donor. For example, a suitable polymer for the binder component can have an increased dielectric constant, or a polymer able to readily accept one or more electrons from an electron donor. The electric field can be used to apply a force upon the binder component carrying one or more negative charges (e.g., a binder component which has received one or more electrons from an electron donor), so as to facilitate fibrillization of the binder component.

As described further herein, the electrical, chemical, and/or mechanical properties of the active carbon and/or conductive carbon may be undesirably altered when subjected to a conventional high shear process, such as jet milling or blending, relative to the properties of these materials when subjected to the electric field processes described herein. For example, when the active carbon and/or conductive carbon are mixed with a fibrillizable binder, and subjected to a high shear fibrillization process to fibrillize the binder, the active carbon and/or conductive carbon may be undesirable altered, resulting in reduced performance of the electrode film formed from these components. Such reduction in performance is reduced or eliminated when the same electrode components are combined, but the binder is fibrillized instead through an electric field, such as through an electrostatic fibrillization process. Additionally, the fibrillizable binder may be more efficiently fibrillized in an electric field, relative to a conventional high-shear process, resulting in a more efficient electrode with reduced binder usage.

Figure 2:
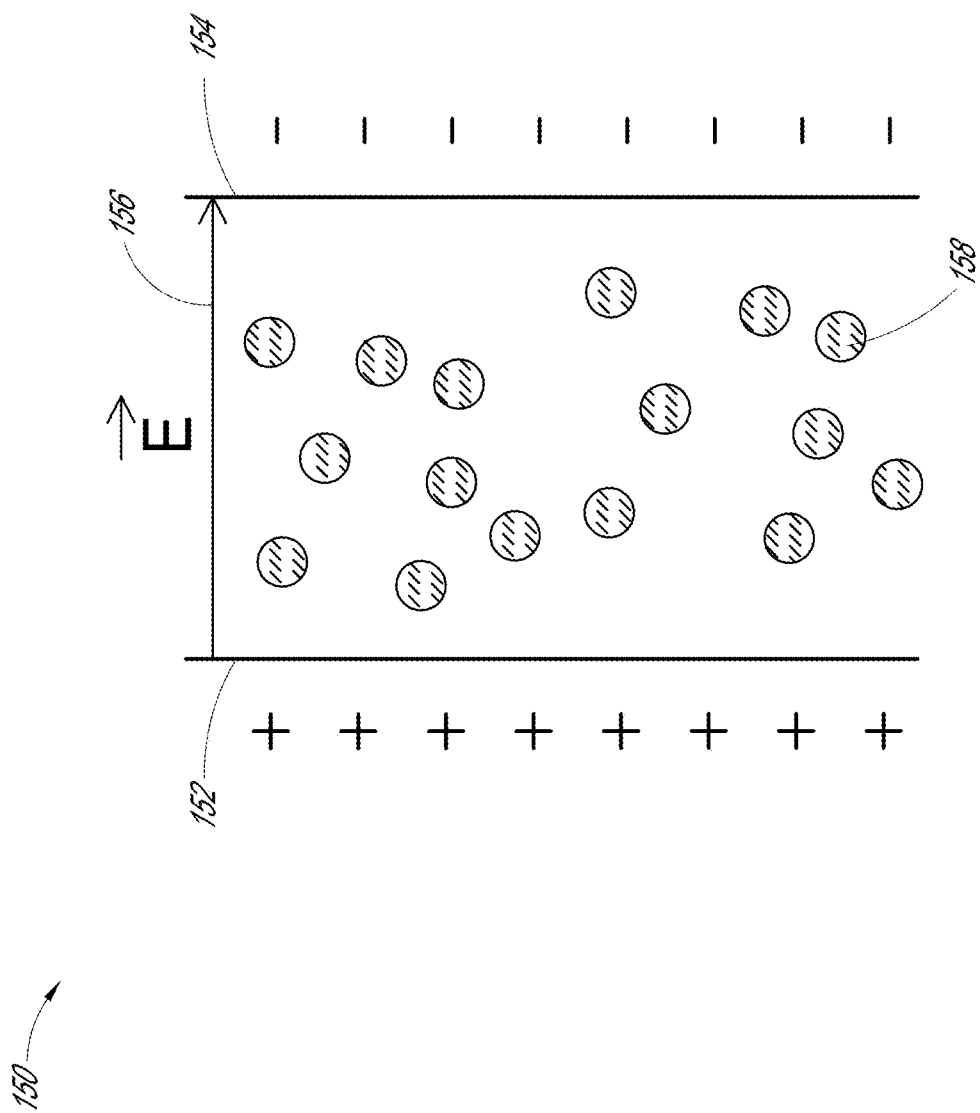
FIG. 2 shows a schematic view of an example of an apparatus for fibrillizing a binder component of an electrode film under an electric field.

FIG. 2 is a schematic view of an example of an apparatus, such as an electric-field generator 150 configured to apply an electric field, such as an electrostatic field or other electric field, to a plurality of charged particles, such as fibrillizable binder particles 158. The apparatus 150 may include a first charged portion 152 and a second oppositely charged portion 154. For example, the first charged portion 152 may have a positive charge and the second charged portion 154 may have a negative charge. As indicated by the arrow 156, an electric field extending from the positively charged portion 152 to the negatively charged portion 154 can be provided, such as between the two charged portions, 152, 154. The electric field provided by the positively charged portion 152 and the negatively charged portion 154 may exert an electric force, such as an electrostatic force, upon charged particles 158 exposed to the electric field. The chemical, electrical, and/or mechanical properties of the charged particles 158 may change when exposed to the electric field. For example, the charged particles 158 may be fibrillized by the force exerted upon the particles 158 by the electric field provided between the first charged portion 152 and the second oppositely charged portion 154.

In some embodiments, the charged binder particles 158 may have a negative charge. As described herein, the binder particles 158 may acquire a negative charge by accepting one or more electrons from an electron donor. For example, the electric field generated by the charged portions 152, 154 of apparatus 150 can exert a force upon the negatively charged binder particles to fibrillize the binder particles. In some embodiments, as will be described in further details herein, a mixing container may comprise the first charged portion 152, and a mixing medium may comprise the second charged portion 154. For example, the mixing container may donate one or more electrons to the mixing medium, the mixing container thereby acquiring a positive charge, and the mixing medium acquiring a negative charge. An electric field, such as an electrostatic field, may be generated by the positively charged mixing container and the negatively charged mixing medium. Without being limited by any particular theory or mode of operation, force exerted upon one or more negatively charged binder particles by the generated electric field may change the properties thereof, for example, and thereby fibrillize, the binder particles. In some embodiments, negatively charged binder particles within the mixing container may contribute to the electric field that exerts force upon charged binder particles to fibrillize the binder particles.

Figure 3:
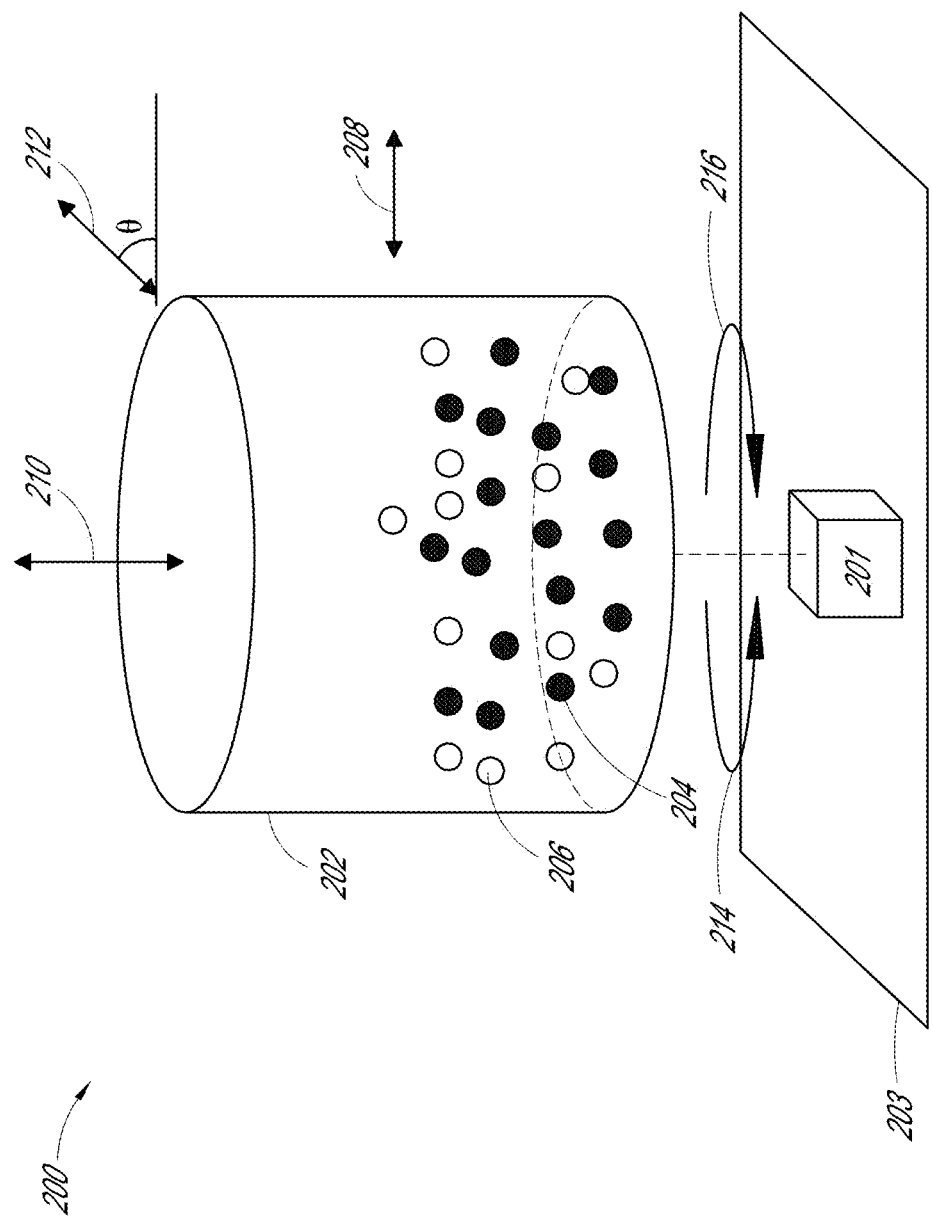
FIG. 3 shows a perspective view of another example of an apparatus for fibrillizing a binder component of an electrode film under an electric field.

FIG. 3 shows an example of a fibrillization apparatus 200 for fibrillizing an electrode film binder component. The fibrillization apparatus 200 may include a mixing container 202 with an inner volume configured to receive an electrode film mixture 206, including a binder component. In some embodiments, the apparatus 200 can include a mixing medium 204, to facilitate mixing of the electrode film mixture 206, and fibrillization of the binder component within mixture 206. For example, the mixing medium 204 and the electrode film mixture 206 may be mixed while received in the inner volume to achieve fibrillization of the binder component within the mixture 206.

The inner volume of the mixing container 202 can have various suitable shapes and/or sizes suitable to contain the mixing medium 204 and/or the electrode film mixture 206. In some embodiments, the inner volume of the mixing container 202 can have a cylindrical or substantially cylindrical shape. In some embodiments, the inner volume of the mixing container 202 can have a spherical or substantially spherical shape. In some embodiments, the inner volume of the mixing container 202 may comprise a shape configured to facilitate increased surface area contact for contacting one or more components within the mixing container 202, and/or facilitate contact between these components and the container 202 itself. For example, the inner volume of the mixing container 202 may comprise a shape configured to provide desired surface area for contact between the mixing medium 204 and/or the electrode film mixture 206 and the mixing container 202, and/or between the mixing medium 204 and the electrode film mixture 206.

The size of the inner volume of the mixing container 202 can be selected based on various factors, including for example, a quantity of an electrode film mixture for processing in the mixing container 202, a material of the mixing medium 204, and/or a composition of the electrode film binder component. In some embodiments, a size of the inner volume of the mixing container 202 may be selected to provide sufficient space within which the electrode film mixture 206 and/or mixing medium 204 can move relative to the mixing container 202 and/or one another, when an amount of the electrode film mixture 206 and/or mixing medium 204 are contained within container 202 for processing. For example, the inner volume of the mixing container 202 may include an amount of unoccupied dead space, when containing and mixing the electrode film mixture 206, and fibrillizing the binder component. For example, the mixing container 202 can have an inner volume of sufficient size, relative to the volume of the electrode film mixture 206 and mixing medium 204, to facilitate sufficient movement of the electrode film mixture 206 and/or mixing medium 204 to provide desired contact between the mixing container 202 and the mixing medium 204, between the electrode film mixture 206 and the mixing medium 204, and/or between the electrode film mixture 206 and the mixing container 202. Providing an inner volume within container 202 with sufficient dead space, relative to the components contained within container 202, such as the electrode film mixture 206 and mixing medium 204, during processing, can facilitate fibrillization of the electrode film binder component. In some embodiments, the mixing container 202 has a volume sufficient to facilitate generation of electrostatic field, so as to provide fibrillization of the electrode film binder component. In some embodiments, the inner volume of the mixing container 202 may have about 5% to about 45% dead space, including about 5% to about 35% dead space, with the remainder of the inner volume containing the electrode film mixture 206, or the mixing medium 204 and the electrode film mixture 206. In some embodiments, the inner volume of the mixing container 202 may have about 5% to about 20% dead space, including about 5% to about 10% dead space, with the remainder of the inner volume containing the electrode film mixture 206, or the mixing medium 204 and the electrode film mixture 206.

A mixing container 202 comprising too large of a dead space may reduce efficiency in generating the electrostatic field within the container 202, reducing or preventing fibrillization of the binder component of the electrode film mixture 206. A mixing container 202 having too small of a dead space may reduce or prevent desired movement of the mixing medium 204 and/or electrode film mixture 206 within the container 202, reducing or preventing fibrillization of the binder component of the electrode film mixture 206.

The mixing container 202 can be made of a material having an increased affinity to donate electrons, including natural and/or synthetic materials. For example, the mixing container 202 may comprise a material with an affinity to donate electrons to the mixing medium 204 and/or a binder component of the electrode film mixtures 206. In some embodiments, the mixing container 202 can be made of a material comprising a metal. In some embodiments, the mixing container 202 can be made of aluminum, lead, and/or alloys thereof. In some embodiments, the mixing container 202 can be made of a material comprising leather, fur, glass, polyamides (e.g., nylon), silk, cellulose (e.g., paper), and/or combinations thereof. In some embodiments, at least a portion of the mixing container 202 can be coated with one or more materials having an affinity to donate electrons. For example, one or more surfaces of the mixing container 202 can be coated with aluminum. In some embodiments, all or substantially all of the surfaces of a mixing container 202 configured to be in contact with the mixing medium 204 and/or the electrode film mixture 206, such as all or substantially all interior surfaces of the mixing container 202, are coated with aluminum. In some embodiments, one or more surfaces of the mixing container 202 can be coated with lead, including one or more surfaces configured to be in contact with the mixing medium 204 and/or the electrode film mixture 206.

Material for the mixing medium 204 can be selected based on various factors, including for example, a material of the electrode film binder component, and/or a material of the mixing container 202. In some embodiments, the mixing medium 204 can be made of a material having a desired tendency to accept one or more electrons from the mixing container 202. For example, the mixing medium 204 can be an electron acceptor with respect to the mixing container 202, which can be the electron donor. In some embodiments, the mixing medium 204 can have a sufficient affinity to donate one or more electrons to the electrode film binder component. In this way, the mixing medium 204 can be the electron donor with respect to the electrode film binder component. In some embodiments, the mixing medium 204 can be made of material having a sufficient tendency to accept one or more electrons from the mixing container 202, while having a sufficient tendency to donate one or more electrons to the electrode film binder component. For example, the mixing medium 204 can be configured to transfer one or more electrons from the mixing container 202 to the electrode film binder component. In some embodiments, the mixing medium 204 may be made of material having the same or similar, or lower affinity, for donating a negative charge as the mixing container 202 such that the mixing container 202 can transfer negative charge to the mixing medium 204 with contact between the mixing container 202 and the mixing medium 204. In some embodiments, the mixing medium 204 may comprise a material having the same or similar, or lower affinity for accepting a negative charge as the binder component such that charge transfer from the mixing medium 204 to the binder component may readily occur with contact between the two.

In some embodiments, the mixing medium 204 can be made of a natural and/or synthetic material, including for example, wood, amber, rubber, silicon, and/or combinations thereof. In some embodiments, the mixing medium 204 can be made of a metallic material, including aluminum, nickel, copper, brass, silver, gold, platinum, and/or combinations thereof. In some embodiments, the mixing medium 204 can be made of a polymeric material, such as polyester, polyurethane (PU), polyethylene (PE), polypropylene (PP), polyvinyl chloride (PVC), polytetrafluoroethylene (PTFE, e.g., Teflon®) and/or combinations thereof. In some embodiments, the mixing medium 204 can be selected based on an ease in maintaining desired chemical and/or physical integrity of the mixing medium 204. For example, the mixing medium 204 can be selected based on an ease of cleaning and/or restoring one or more properties of the mixing medium after its use. In some embodiments, the mixing medium 204 can be made of aluminum to provide transfer of a negative charge from the mixing container 202 to the binder component of the electrode film mixture 206. For example, the mixing medium 204 may comprise a plurality of units made of aluminum.

The binder component comprises a fibrillizable binder, or may consist essentially of, or consist of a fibrillizable binder. For example, in some embodiments, the binder component comprises polytetrafluoroethylene (PTFE). In some embodiments, the mixing medium 204 comprises a material having a desired tendency to donate electrons to polytetrafluoroethylene. In some embodiments, the mixing medium 204 may comprise a material having a similar or same tendency to accept a negative charge as polytetrafluoroethylene. For example, the mixing medium 204 may comprise polytetrafluoroethylene. In some embodiments, the mixing medium 204 may comprise a material having a lower tendency to accept negative charge as polytetrafluoroethylene. In some embodiments, the binder component comprises polyethylene (PE), including ultra-high-molecular-weight polyethylene (UHMWPE). In some embodiments, the mixing medium 204 comprises a material having a tendency to donate electrons to polyethylene and/or ultra-high-molecular-weight polyethylene. For example, the mixing medium 204 may comprise a material having about the same or lower tendency to accept a negative charge as polyethylene.

The mixing medium 204 can include a plurality of units having various suitable sizes and/or shapes suitable to facilitate the electrostatic fibrillization described herein. In some embodiments, one or more units of the mixing medium 204 may comprise a shape configured to provide a desired surface area for contacting the mixing container 202 and/or the electrode film mixture 206. In some embodiments, each unit of the mixing medium 204 can have a spherical or substantially spherical shape. For example, the mixing medium 204 can comprise a plurality of metallic units and/or polymeric units. In some embodiments, the mixing medium 204 can include a plurality of polytetrafluoroethylene (e.g., Teflon®) units having a spherical or substantially spherical shape. The units within the mixing medium can comprise various other three-dimensional shapes, such as rods, pins, cubes, pyramids, etc., and are not limited to spherical shapes.

A size of one or more units of the mixing medium 204 can be selected based on a number of factors. For example, the size of a unit of the mixing medium 204 can be selected based on a balance of providing increased surface area for contact with the mixing container 202 and/or the electrode film binder component, and/or for carrying negative charge received from the mixing container 202, while providing units of sufficient size to facilitate fibrillization of the binder component. For example, the units of the mixing medium can be sized with sufficient mass to facilitate mixing of the electrode film mixture. In some embodiments, the mixing medium 204 can comprise a plurality of spherical or substantially spherical units having a diameter of about 1 millimeter (mm) to about 40 mm, including about 5 mm to about 15 mm. For example, each spherical or substantially spherical unit can have a diameter of about 12 mm. It will be understood that these dimensions can be similarly applied to non-spherical embodiments. For example, the mixing medium 204 can include units with non-spherical three-dimensional shapes that have one or more dimensions (e.g., length, width, height, diameter) corresponding with the aforementioned diameters. For example, a cylindrical rod with similar diameters can be employed.

The amount of mixing medium 204 to include in the fibrillization apparatus 200, relative to other components, can be selected based upon various factors. For example, the amount of mixing medium 204 used can be based upon the composition of the mixing medium 204 itself. The amount of mixing medium 204 used can be based upon an amount and/or a type of the electrode film mixture processed by the fibrillization apparatus 200. For example, the amount of mixing medium 204 can be selected to facilitate increased contact between the electrode film binder component, the mixing medium, and/or between the mixing container 202. The amount of mixing medium 204 can be selected to facilitate transfer of charge to the binder component, and/or generation of an electrostatic field. The amount of mixing medium 204 can be selected based upon one or more of the above factors, while also reducing the amount of mixing medium 204 used. A reduced amount of mixing medium 204 can increase the amount of electrode film mixture 206 that can be processed within the mixing container 202. In some embodiments, the mixing medium 204 can be about 2 times to about 10 times the weight of the electrode film mixture 206, including about 3 times to about 8 times the weight of the electrode film mixture 206. For example, the mixing medium 204 may be about 8 times the weight of the electrode film mixture 206. In one embodiment, the mixing medium 204 can have a weight of about 8 times that of the electrode film mixture 206 processed, including an electrode film mixture comprising a polytetrafluoroethylene binder component. Such ratios based upon weight between the mixing medium and the electrode film mixture can provide improved surface contact and electron donation between the components, while increasing the amount of electrode film mixture that is being processed.

As described above, contact between the mixing medium, the mixing container, and/or the electrode film binder component can facilitate transfer of electrons from the mixing container and/or the mixing medium to the electrode binder component. Such contact between these components can facilitate generation of the electrostatic field for manipulating the negatively charged fibrillizable electrode film binder component. This electron transfer and electrostatic field generation can be provided by moving the mixing container, mixing medium and/or the electrode film binder component relative to one another, such as by applying a force upon the mixing container, mixing medium and/or the electrode film binder component.

The mixing container 202 can be moved in a variety of manners. For example, the mixing container can be moved manually or automatically. The fibrillization apparatus 200 can include one or more devices, such as an actuator 201, shown schematically in FIG. 3, for applying a linear, and/or rotational force upon the mixing container 202. Such force(s) can translate to movement of container 202 in one or more directions. The actuator 201 can include one or more motors, linear actuators, slides, bearings, or any of a number of suitable devices capable of providing relative motion between container 202 and another supporting component, such as a base 203. In some embodiments, the mixing container 202 can be moved in a lateral direction (e.g., horizontally, as shown by the horizontal arrow 208, or into a horizontal plane of the view shown in FIG. 3). The mixing container 202 can be moved in a vertical direction (e.g., vertically, as shown by vertical arrow 210 in FIG. 3). The mixing container 202 can be moved in an angled direction (e.g., in a direction at an angle theta (Θ) greater than zero, and other than at a right angle relative to a horizontal plane, such as ground, for example as shown by angled arrow 212 in FIG. 3). In some embodiments, the mixing container 202 can be rotated in a clockwise direction (arrows 214), or in a counter-clockwise direction (arrows 216). The container can be configured to move in any of a number of different lengths (arcs) and patterns, and can be moved through vibration, oscillation, sonication, or through other methods, in one or more of any of the aforementioned directions. In some embodiments, a magnitude of the force to the mixing container and/or a rate of repetition of the applied force can be selected to facilitate efficient fibrillization of the electrode film binder component of the electrode film mixture 206. For example, the magnitude of the force applied and/or the rate of repetition of the applied force can be selected based on a weight and/or a material of the mixing container, mixing medium, electrode film mixture, and/or electrode film binder component. Examples of suitable actuators 201 can include a paint shaker, an acoustic mixer, and/or the like. In some embodiments, the actuator 201 can include a resonant acoustic mixer.

In some embodiments, force can be applied to the mixing medium and/or electrode film mixture to displace and move two or more of the mixing medium, electrode film mixture (including its binder component) and mixing container relative to each other. For example, an actuator can use sonication to agitate the mixing medium and/or the electrode film mixture. A frequency of the sonication process can be selected based on a number of parameters, including for example, a weight and/or a material of the mixing container, mixing medium, electrode film mixture, and/or electrode film binder component.

In some embodiments, the fibrillization apparatus 200 can include one or more components configured to prevent or substantially prevent electrical discharge by the mixing container 202, for example electrical discharge to an electrical ground. In some embodiments, the mixing container 202 can include an outer cover which is electrically insulating or substantially electrically insulating. For example, the outer cover can enclose or substantially enclose the mixing container 202 so as to prevent discharge of electrical charge to ground by the mixing container 202. In some embodiments, the mixing container 202 can be positioned on an apparatus, such as a stand made of an electrically insulating or substantially electrically insulating material to prevent or substantially prevent electrical discharge by the mixing container 202. The mixing container cover and/or the apparatus upon which the mixing container is positioned may be made of an electrically insulating material, and/or can be coated with an electrically insulating material.

Figure 4:
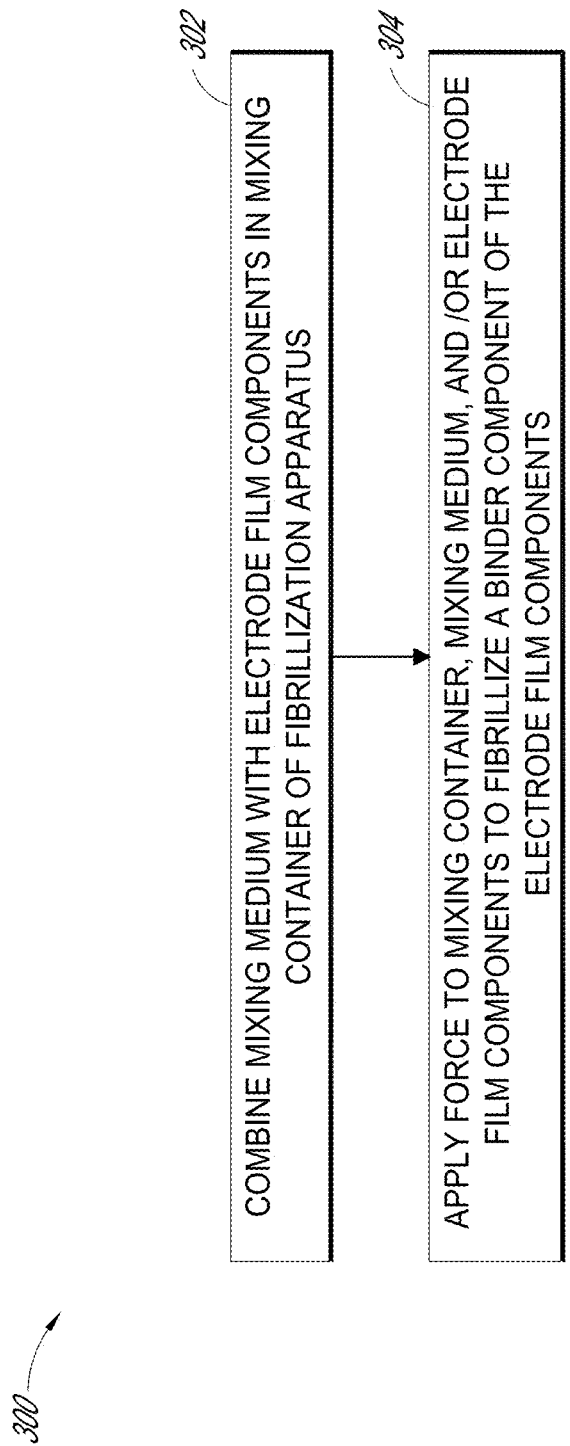
FIG. 4 shows an example of a process for fibrillizing a binder component of an electrode film.

FIG. 4 shows an example of a process 300 for fibrillizing an electrode film binder component using an electrostatic field, such as an electrode film suitable for use in an ultracapacitor and/or a battery. In block 302, a mixing medium, such as mixing medium 204 as described with reference to FIG. 3, can be combined with components of the electrode film in a mixing container, such as mixing container 202 as described with reference to FIG. 3. The components of the electrode film can include a fibrillizable binder, which, when mixed with other electrode film components, such as activated and/or conductive carbon, form an electrode film mixture. In block 304, a force can be applied to the mixing container, the mixing medium, and/or the electrode film components. This force facilitates movement of the mixing container, mixing medium, and/or the electrode film binder component relative to one another, and/or facilitates contact between the electrode film binder component, mixing medium and/or the mixing container. Such movement and/or contact can result in fibrillization of the binder component. For example, a force can be applied to the mixing container, such as by shaking the mixing container along one or more directions (e.g., horizontal, vertical, and/or at an angle other than horizontal or vertical), and/or by rotating the mixing container. For example, a force can be applied to the mixing components and/or mixing medium (e.g., an acoustic force).

Figure 5:
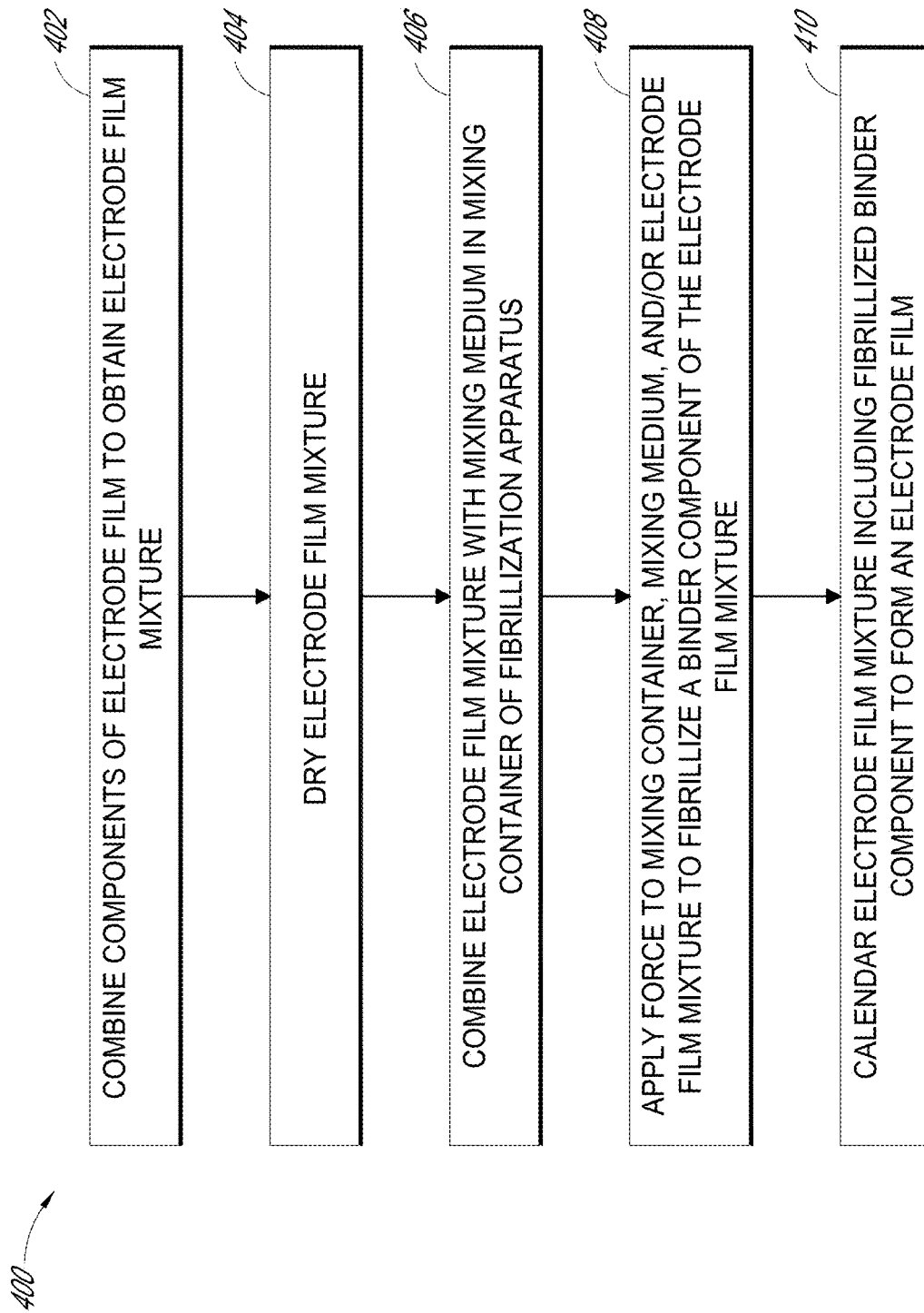
FIG. 5 shows an example of a process for fabricating an electrode film including a fibrillized binder component.

FIG. 5 shows an example of a process 400 for fabricating an electrode film of an energy storage device. In block 402, components for an electrode film can be combined. For example, components of the electrode film including the electrode film binder component, and other components, such as an activated carbon component, and/or a conductive carbon black component, can be combined. These components can be mixed, either during or after they are being combined, to form a homogenous or substantially homogenous electrode film mixture. In some embodiments, components of the electrode film mixture may be subjected to a universalization process. For example, the universalization process may uniformly or substantially uniformly mix the components of the electrode film mixture, such as creating a homogeneous or substantially homogeneous mixture. Mixing and/or universalization of the components of the electrode film can be performed in a variety of suitable lower-shear mixing apparatuses, including for example a roll mixer and/or an acoustic mixer. In some embodiments, a lower-shear mixer may comprise a resonant acoustic mixer.

The mixing process can be performed for a period of time to achieve desired level of mixing of the electrode film components. In some embodiments, an electrode film mixture can be mixed in a roll mixer for about 12 hours to about 20 hours to achieve a desired level of mixing. In block 404, the electrode film mixture can undergo a drying process. Drying of the electrode film mixture can be performed in an oven, such as a vacuum oven. The drying process can aid removal of moisture from one or more components of the electrode film to facilitate a more efficient fibrillization process. For example, removal of residual moisture from the electrode film mixture can facilitate transfer of negative charge from the mixing container and/or the mixing medium to the electrode film binder component, and/or the generation of an electrostatic field for manipulating negatively charged electrode film binder components. A temperature and/or duration of the drying process can be selected, for example, based on a quantity of the mixture being dried, and/or a degree of dryness desired (e.g., the amount of moisture removal desired). In some embodiments, the drying process can be performed at a temperature of about 70° C. to about 100° C., including about 80° C. to about 90° C. The drying process can be performed for a period of about 5 minutes to about 20 hours, including for example from about 5 hours to about 15 hours. For example, the drying process can be performed at a temperature of about 85° C. for about 12 hours. In some embodiments, components of the electrode film may not undergo a drying process.

In block 406, the electrode film mixture (e.g., mixture including components that underwent a drying process) can be combined in a mixing container of a fibrillization apparatus (e.g., fibrillization apparatus 200 of FIG. 3) with a mixing medium. In block 408, a force can be applied to the mixing container, the mixing medium, and/or the electrode film mixture such that the mixing container, mixing medium, and/or the electrode film mixture can move relative to one another, and/or to facilitate contact between the electrode film binder component, mixing medium and/or the mixing container. The force applied in block 408 can be selected to facilitate increased contact between the mixing container, the mixing medium, and/or the electrode film mixture, including the binder component. Without being limited by theory or any particular mode of operation, increased contact between the mixing container, the mixing medium, and/or the electrode film binder component, may facilitate increased transfer of electrons from the mixing container and/or mixing medium to the binder component, and/or improve generation of a desired electrostatic field for facilitating fibrillization of the binder component. For example, increased contact between the mixing container, the mixing medium, and/or the electrode film binder component, may facilitate generation of a more uniform electrostatic field, facilitating improved efficiency and/or uniformity in the binder fibrillization process. In some embodiments, the mixing container can be shaken by applying a linear or substantially linear force to move the mixing container back and forth along one or more direction (e.g., a horizontal, vertical, and/or angled direction), and/or along an arced path around an axis (e.g., a horizontal, vertical, and/or angled axis). In some embodiments, a rotational force can be applied to the mixing container. In some embodiments, a force can be applied to the mixing medium and/or the electrode film mixture, including for example an acoustic force (e.g., a sonication process).

In block 410, the electrode film mixture can be calendared to form an electrode film (e.g., one or more of electrode films 112, 114, 116, 118 of FIG. 1). For example, the film mixture can be calendared to form a free-standing film. In some embodiments, the electrode film can be formed over one or more surfaces of an energy storage device current collector (e.g., one or more of current collectors 108, 110 of FIG. 1). In some embodiments, the electrode film can be calendared directly onto a surface of a current collector. In some embodiments, an adhesive material can be used to facilitate adhesion of the electrode film to the surface of the current collector.

Electrical performance of a first ultracapacitor, for example in a coin cell configuration, fabricated using electrode films which underwent shear-based fibrillization was compared to the electrical performance of a second ultracapacitor comprising electrode films fabricated using an electric field fibrillization process. The electrodes of the two ultracapacitors included a binder component comprising polytetrafluoroethylene, activated carbon, and an electrically conductive carbon black component. Fabrication of the two ultracapacitors included calendaring the fibrillized electrode film mixtures onto respective current collectors. The electrodes of the two ultracapacitors were fabricated using dry particles electrode film mixtures. The two electrodes of the two ultracapacitors were fabricated using mixtures comprising a fibrillizable binder component at about 8 weight % to about 10 weight %, a carbon black component at about 0.5 weight % to about 2 weight %, and an activated carbon component at about 88 weight % to about 92 weight %.

The coin cell ultracapacitor comprising electrodes which underwent shear-based fibrillization demonstrated an equivalent series resistance (ESR) of about 1.22 Ohms ($\Omega$) and a capacitance of about 0.606 Farads (F). The coin cell ultracapacitor comprising electrodes which underwent electrostatic field fibrillization demonstrated an ESR of about 0.91$\Omega$ and a capacitance of about 0.588 F. As shown by the comparison, the coin cell ultracapacitor comprising the electrodes fabricated using electrostatic field fibrillization demonstrated an ESR about 25% lower than that of the ultracapacitor comprising electrodes fabricated using shear-based fibrillization, while maintaining comparable capacitance performance as that of the ultracapacitor comprising electrodes fabricated using shear-based fibrillization.

FIGS. 6A-9B show scanning electron microscope (SEM) images of cross-section views of various electrode films made from various respective dry particles electrode film mixtures.

Figures 6A, 6B:
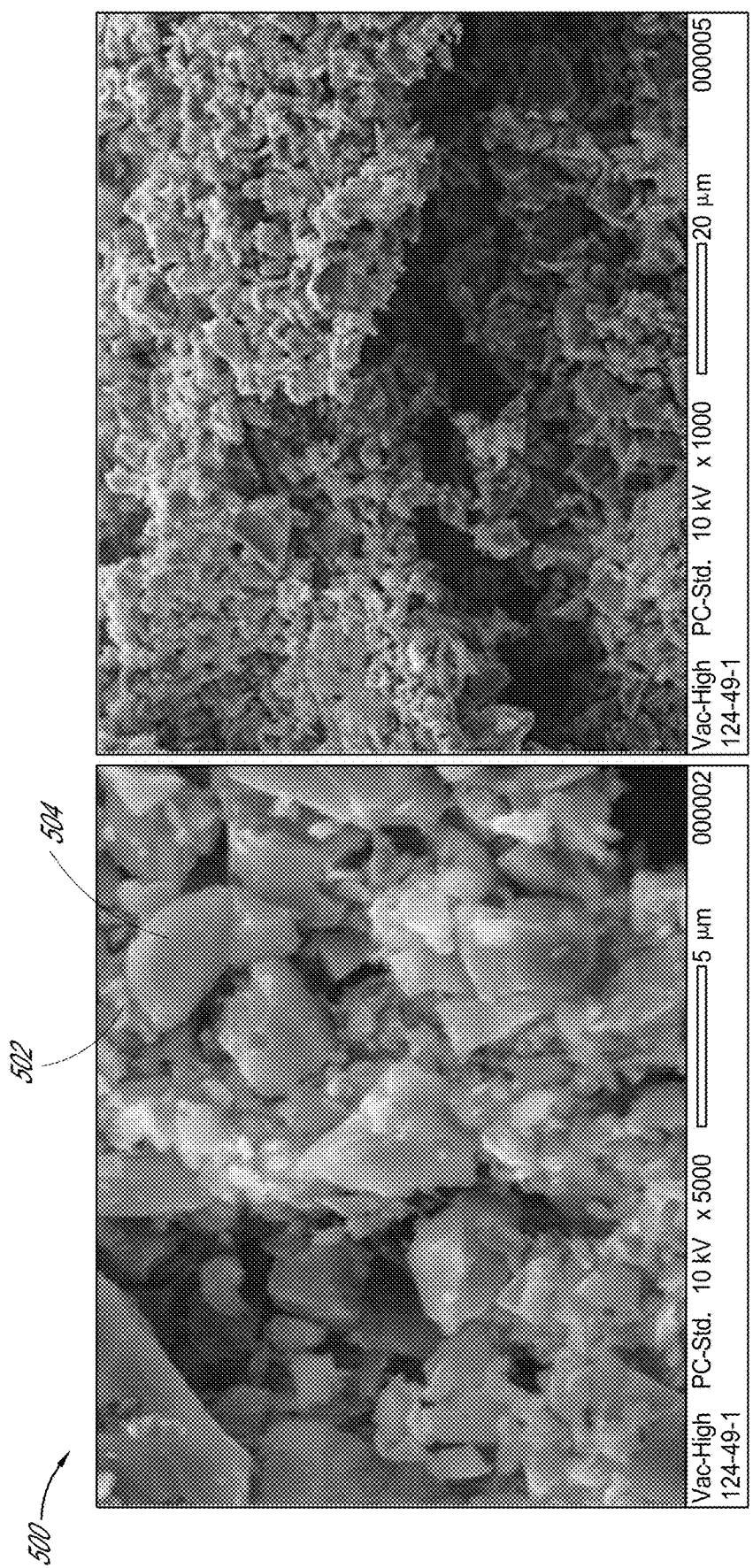
FIG. 6A shows a scanning electron microscope (SEM) image, at 5 k× magnification, of an electrode film.
FIG. 6B shows a scanning electron microscope (SEM) image, at 1 k× magnification, of the electrode film shown in FIG. 6A.

FIGS. 6A and 6B show two scanning electron microscope (SEM) images of cross-section views of an electrode film 500. FIG. 6A shows a cross-section view of the electrode film 500 at 5 k× magnification and FIG. 6B shows a cross-section view of the electrode film 500 at 1 k× magnification. The electrode film 500 shown in FIGS. 6A and 6B was fabricated without or substantially without a process in which the electrode film mixture underwent repeated contact with a mixing medium and/or a mixing container of a fibrillization apparatus (e.g., the fibrillization apparatus 200 as described with reference to FIG. 3). The electrode film 500 was formed using an electrode film mixture having components which were combined in a mixing apparatus (e.g., mixed in a roll mixer, for a period of at least about 12 hours) such that the components of the electrode film 500 were uniformly or substantially uniformly mixed, and where the electrode film mixture was dried in a vacuum oven (e.g., at about 85° C., for a period of about 12 hours) to facilitate removal of any residual moisture. The electrode film 500 included an activated carbon component, a conductive carbon black component and a binder component comprising polytetrafluoroethylene (PTFE). The dried electrode film mixture was subsequently calendared to form the electrode film 500, without or substantially without a process in which the electrode film mixture was shaken and/or otherwise agitated within a fibrillization apparatus to provide repeated contact between the electrode film binder component and the fibrillization apparatus. FIGS. 6A and 6B show that minimal, and/or no or substantially no fibrils were formed in the electrode film. At higher magnification, FIG. 6A shows a clearer view of PTFE particles 502 dispersed amongst the activated carbon component 504 of the electrode film 500. As can be seen in FIG. 6A, the electrode film 500 included no or substantially no PTFE fibrils.

Figures 7A, 7B:
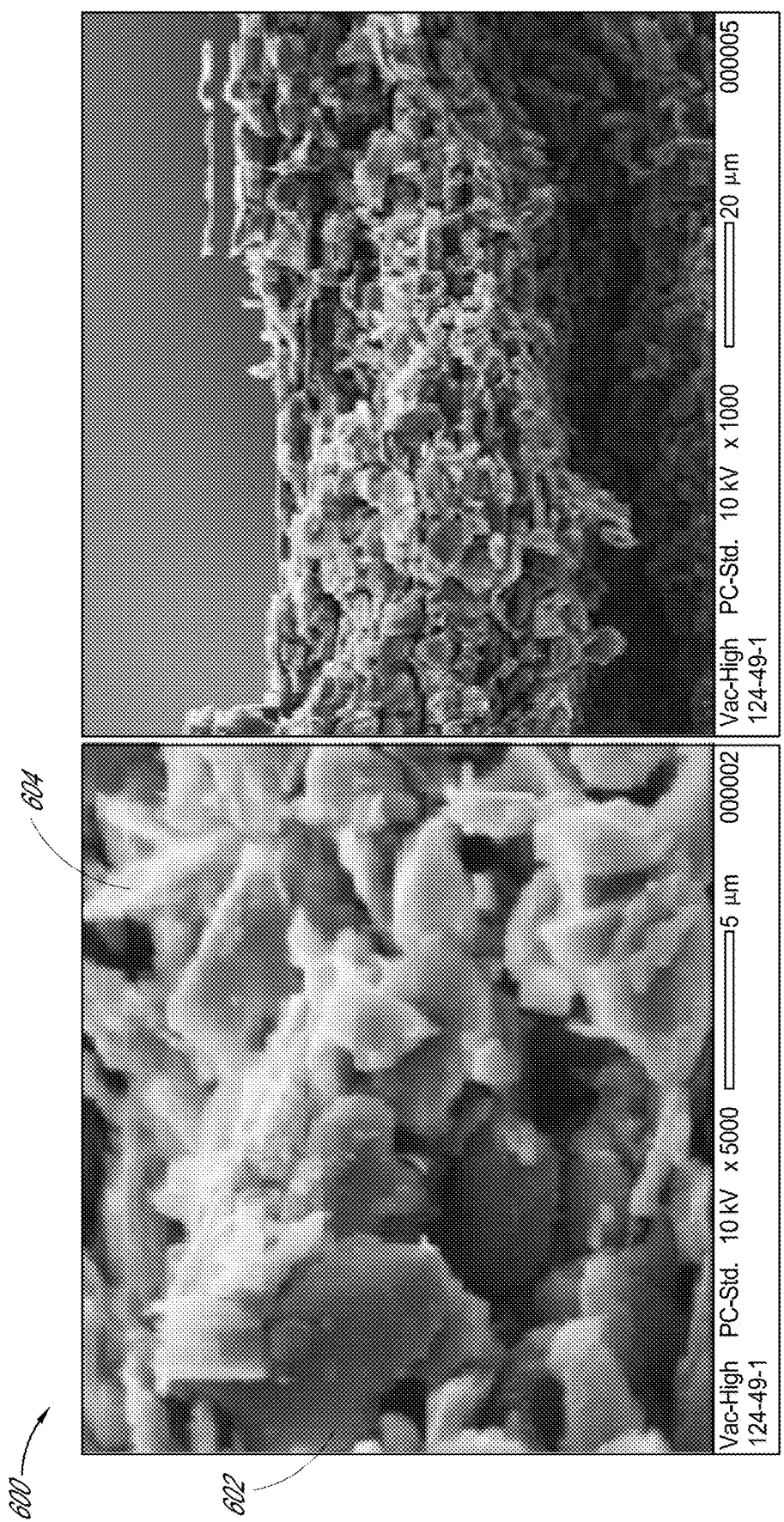
FIG. 7A shows a scanning electron microscope (SEM) image, at 5 k× magnification, of an electrode film.
FIG. 7B shows a scanning electron microscope (SEM) image, at 1 k× magnification, of the electrode film shown in FIG. 7A

FIGS. 7A and 7B show two scanning electron microscope (SEM) images of cross-section views of an electrode film 600. FIG. 7A shows a cross-section view of the electrode film 600 at 5 k× magnification and FIG. 7B shows a cross-section view of the electrode film 600 at 1 k× magnification. Components of the electrode film 600 were combined in a mixing apparatus (e.g., a roll mixer, for a duration of at least about 12 hours). The electrode film 600 included the same or substantially the same composition as the electrode film 500 (e.g., including an activated carbon component, a conductive carbon black component and a binder component comprising polytetrafluoroethylene (PTFE)). The electrode film mixture was dried in a vacuum oven (e.g., at about 85° C., for a period of about 12 hours) to facilitate removal of any residual moisture. The dried electrode film mixture of electrode film 600 was combined in a mixing container of a fibrillization apparatus (e.g., fibrillization apparatus 200 of FIG. 3) with a mixing medium comprising PTFE beads (e.g., PTFE beads having a diameter of about 13 millimeters), where the mixing container is made of a material comprising polystyrene. The electrode film mixture and the mixing medium were shaken in a mixing container of the fibrillization apparatus for a period of about 15 minutes, and the shaken mixture was then calendared to form the electrode film 600. For example, the mixing container can be moved vertically (e.g., up-and-down), horizontally (e.g., left-and-right) and/or rotationally to facilitate fibrillization. FIGS. 7A and 7B show that electrode film 600 includes minimal, and/or no or substantially no fibrils. For example, FIG. 7A shows PTFE particles 602 dispersed amongst activated carbon component 604. Without being limited by any particular theory or any particular mode of operation, a mixing container made of a polystyrene material may have insufficient affinity to donate negative charge. For example, the polystyrene mixing container may have insufficient affinity to donate negative charge to the mixing medium and/or binder component comprising PTFE, thereby preventing or substantially preventing generation of an electrostatic field in which binder components carrying negative charges may be manipulated to form fibrils.

Figures 8A, 8B:
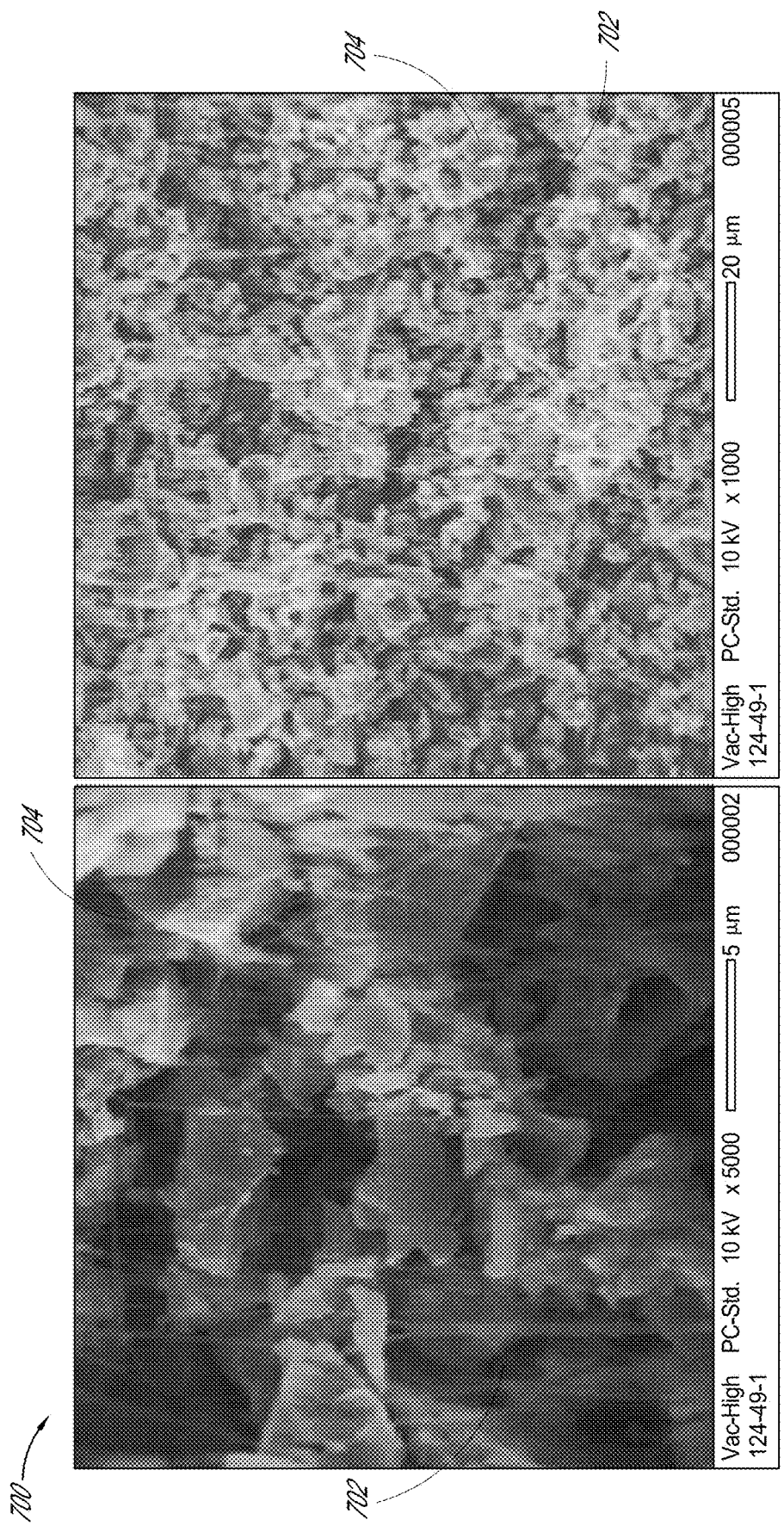
FIG. 8A shows a scanning electron microscope (SEM) image, at 5 k× magnification, of an electrode film.
FIG. 8B shows a scanning electron microscope (SEM) image, at 1 k× magnification, of the electrode film shown in FIG. 8A.

FIGS. 8A and 8B show two scanning electron microscope (SEM) images of cross-section views of an electrode film 700. FIG. 8A shows a cross-section view of the electrode film 700 at 5 k× magnification and FIG. 8B shows a cross-section view of the electrode 700 film at 1 k× magnification. Electrode film 700 had the same or substantially the same composition as electrode films 500, 600 of FIGS. 6A/6B and 7A/7B, respectively. For example, electrode film 700 included an activated carbon component, a conductive carbon black component and a binder component comprising polytetrafluoroethylene (PTFE). The electrode film 700 was fabricated using a process similar to that used to fabricate electrode film 600, except that a mixing container made of an aluminum material was used in the fibrillization apparatus. Components of the electrode film 700 were combined in a roll mixer, for a duration of at least about 12 hours, and subsequently dried in a vacuum oven at about 85° C., for a period of about 12 hours to facilitate removal of any residual moisture. The dried electrode film mixture of electrode film 700 was combined in a mixing container of a fibrillization apparatus similar to fibrillization apparatus 200 of FIG. 3 with a mixing medium. The mixing medium was made of substantially spherical PTFE units having a diameter of about 13 millimeters. The mixing container was made of a material comprising aluminum. The electrode film mixture and the mixing medium were shaken in the mixing container of the fibrillization apparatus for a period of about 15 minutes. The shaken mixture was then calendared to form the electrode film 700. Referring to FIGS. 8A and 8B, PTFE fibrils 702 can be clearly seen on surfaces of the activated carbon component of the electrode film 700, demonstrating effective fibrillization of the binder component. Without being limited by any particular theory or any particular mode of operation, a mixing container made of an aluminum material can have sufficient affinity to donate electrons to the mixing medium comprising PTFE beads and/or the PTFE binder component, facilitating placement of negative charges on the PTFE binder component and/or generation of an electrostatic field, such that the negatively charged PTFE binder component can be manipulated by the electrostatic field, facilitating fibrillization of the PTFE binder component.

Figures 9A, 9B:
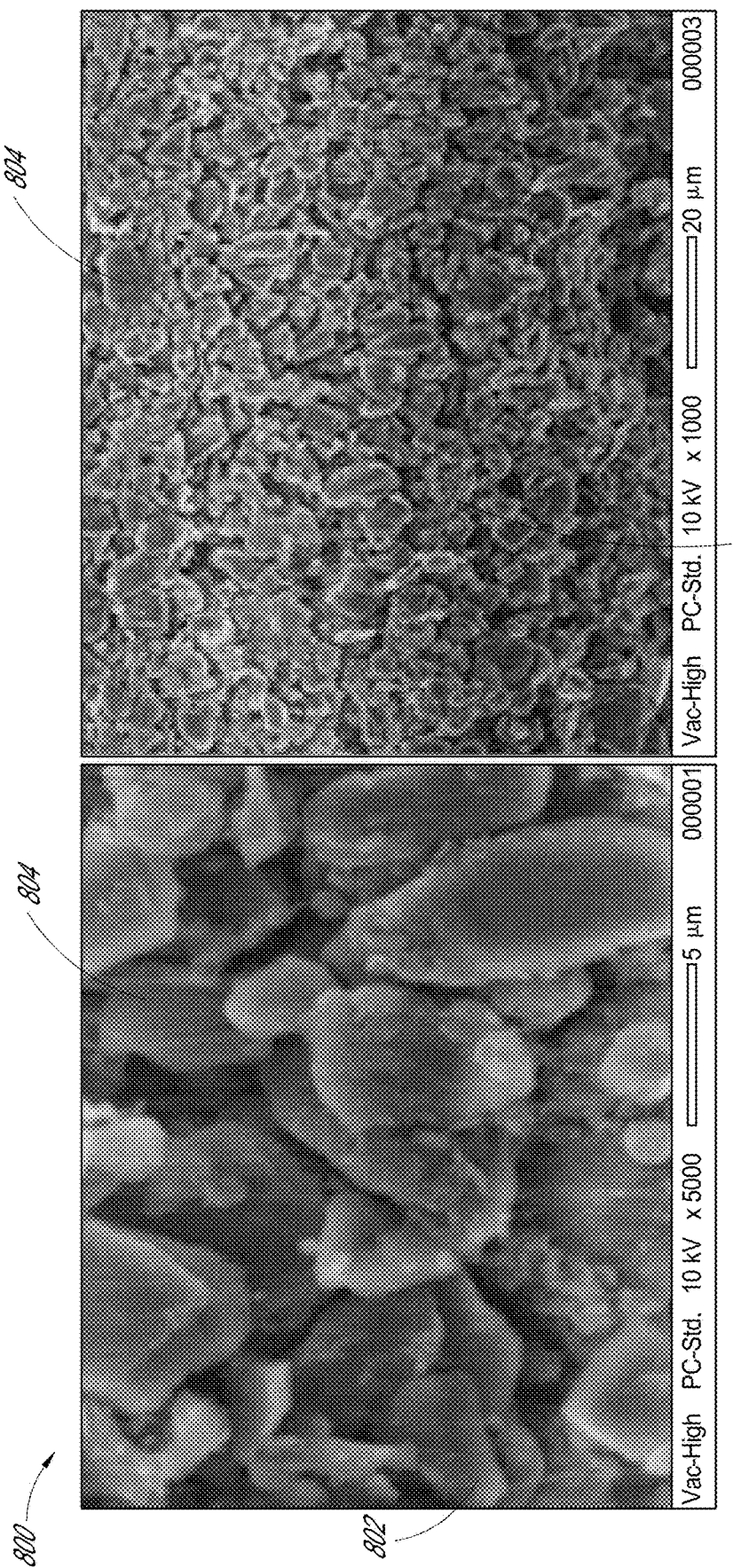
FIG. 9A shows a scanning electron microscope (SEM) image, at 5 k× magnification, of an electrode film.
FIG. 9B shows a scanning electron microscope (SEM) image, at 1 k× magnification, of the electrode film shown in FIG. 9A.

FIGS. 9A and 9B show two scanning electron microscope (SEM) images of cross-section views of an electrode film 800. FIG. 9A shows a cross-section view of the electrode film 800 at 5 k× magnification and FIG. 9B shows a cross-section view of the electrode film 800 at 1 k× magnification. The electrode film 800 had a composition similar to that of electrode films 500, 600, and 700 described herein with reference to one or more of FIGS. 6A-8B. Components of the electrode film 800 were mixed, and the binder component was fibrillized using a high shear mechanical fibrillization process (by blending the electrode film mixture in a jet mill). The electrode film mixture comprising the mechanically fibrillized binder component was then calendared to form the electrode film 800. FIGS. 9A and 9B show PTFE fibrils 802 on surfaces of the activated carbon component 804 of the electrode film 800. Based on comparison of FIGS. 8A, 8B with FIGS. 9A, 9B, it can be seen that fibrillization of a binder component using an electrostatic field can provide results at least as comparable to that achieved by a high sheer mechanical fibrillization process, while achieving improved electrode performance, as described further above.

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Thus, it is intended that the scope of the invention herein disclosed should not be limited by the particular embodiments described above.

The headings provided herein, if any, are for convenience only and do not necessarily affect the scope or meaning of the devices and methods disclosed herein.

What is claimed is:

1. An apparatus for fibrillizing a dry binder component of a dry electrode film mixture, comprising:
   a mixing container, wherein at least a portion of the mixing container is formed of a material having an affinity to donate one or more electrons to a dry binder component contained within the container, the container containing at least one dry active material component;
   an actuator positioned outside of the container; and
   a base configured to support the actuator,
   wherein the actuator is configured to:
   apply a force upon the mixing container,
   cause the portion of the mixing container to contact the dry binder component,
   cause the mixing container to move relative to the base with a speed and within a range of motion sufficient to create an electrostatic force on the dry binder component, and
   fibrillize the dry binder component among or on one or more surfaces of the dry active material component, wherein the actuator fibrillizes the dry binder component based on manipulating the dry binder component via the electrostatic force created on the dry binder component.

2. The apparatus of claim 1, further comprising:
   the dry binder component; and
   a mixing medium comprising a material having an affinity to transfer negative charge from the mixing container to the dry binder component.

3. The apparatus of claim 2, wherein the mixing medium comprises a same material as the dry binder component.

4. The apparatus of claim 3, wherein the mixing medium and dry binder component both comprise polytetrafluoroethylene.

5. The system of claim 2, wherein the actuator is further configured to apply the force upon the dry binder component.

6. The apparatus of claim 1, wherein the actuator is configured to apply an acoustic force to the dry binder component.

7. The apparatus of claim 1, wherein the mixing container comprises an aluminum material.

8. The apparatus of claim 7, wherein the mixing medium comprises a different material from the mixing container.

9. The apparatus of claim 1, wherein the actuator is configured to apply at least one of a linear force and a rotational force upon the mixing container.

10. The apparatus of claim 1, further comprising a low shear mixer for combining the dry binder component with the dry active material component or other components of the dry electrode film mixture.

11. A system, comprising:
    an electric-field generator;
    a container, wherein at least a portion of the mixing container is formed of a material having an affinity to donate one or more electrons to a dry binder component contained within the container, the container containing at least one dry active material component; and
    a fibrillizable binder component,
    wherein the electric field generator is configured to:
    apply an electric field to the dry fibrillizable binder component, and
    fibrillize the dry fibrillizable binder component among or on one or more surfaces of the dry active material component with the electric field when the dry fibrillizable binder component is contained within the container based on manipulating the dry fibrillizable binder component via the electric field applied to the dry fibrillizable binder component.

12. The system of claim 11, further comprising an actuator positioned outside of the container and configured to apply a force upon the container.

13. The system of claim 11, further comprising a vacuum oven configured to heat a fibrillizable binder component to create the dry fibrillizable binder component and to heat an active material component to create the dry active material component prior to the electric field being applied upon the fibrillizable binder component.

14. The system of claim 11, wherein the fibrillizable binder component comprises polytetrafluoroethylene.

* * * * *